March 22, 1949.  F. A. SCHENKER ET AL  2,465,278
EXPANSIVE CEMENT
Filed Aug. 20, 1946  2 Sheets-Sheet 1

INVENTORS
FRITZ A. SCHENKER
AND THEODORE A. SHANN
BY WM. S. Pritchard
ATTORNEY

Patented Mar. 22, 1949

2,465,278

UNITED STATES PATENT OFFICE 2,465,278

EXPANSIVE CEMENT

Fritz A. Schenker and Theodore A. Shann, Zurich, Switzerland, assignors to Kaspar Winkler & Co., Altstetten-Zurich, Switzerland, a corporation of Switzerland Application August 20, 1946, Serial No. 691,856
In Switzerland October 25, 1945

1 Claim. (Cl. 106—314)

This invention relates to hydraulic binding agents, such as cements, mortars, as well as mixtures thereof such as concrete, beton and the like. More particularly, it relates to hydraulic binding agents which will permanently increase in volume during hydration, and to the method of preparing such hydraulic binding agents, as well as compositions for producing expansive effects in hydraulic binding agents.

It is generally known that hydraulic binding agents, particularly Portland cement, are subject to a certain degree of shrinkage during hardening and drying. This shrinkage is due to the change, hardening and crystallization of gels which are formed during hydration. This necessitates precautionary measures in the use of the binding agents, such as diluting with aggregates of suitable gradation or, in the case of work on a larger scale, by installing contraction joints. Attempts have been made to counteract such shrinkage by adding finely ground inert powders to the binding agents or materials which, due to hygroscopic action, maintain permanent moisture in the concrete. Such additions, however, did not produce satisfactory results.

French Patent No. 780,747 discloses overcoming the above-mentioned problems by incorporating in Portland cement, as by grinding or blending therewith, a sufficient quantity of sulfate in the form of a special cement. This special cement is based on sulfo-aluminate compounds and is obtained by burning at 900°–1500° C. a mixture of clay or bauxite, gypsum, and limestone. The burned product composed of sulfo-aluminate cements reacts, due to displacement reaction, with the aluminates of the Portland cement and forms crystallized sulfo-aluminates of high water content which are intended to cause swelling and thereby counteract shrinkage.

An object of this invention is to provide a new and improved addition composition which, when incorporated in a hydraulic binding agent, will upon hydration of the binding agent form an expansive agent which will produce a permanent increase in volume.

Another object of this invention is to provide a new and improved addition composition which, when incorporated in a hydraulic binding agent, will upon hydration of the binding agent form an expansive agent which will produce a permanent increase in volume to at least compensate for and offset shrinkage.

An additional object of this invention is to provide a new and improved hydraulic binding agent which will permanently increase in volume upon hydration to at least compensate for and offset shrinkage.

A further object of this invention is to incorporate in a hydraulic binding agent an addition composition composed of such ingredients that, when the binding agent is gauged with water, such ingredients will, with or without reacting with any of the components of the cement of the hydraulic binding agent or compounds formed during the hydration of the binding agent itself, form aluminates of high content of crystalline water.

A still further object of this invention is to provide a method of obtaining a permanent increase in volume of hydrating hydraulic binding agents to at least compensate for and offset shrinkage.

Other and additional objects will become apparent hereinafter.

The objects of this invention are accomplished, in general, by incorporating in the hydraulic binding agent calcium hydroxide, calcium sulfate and a reactive aluminum compound in such relative proportions that, when the hydraulic binding agent is gauged with water, such added substances will, with or without reacting with any of the ingredients of or the compounds formed during the hydration of the hydraulic binding agent, form an expansive agent, i. e. calcium sulfo-aluminate having a high content of crystalline water.

The hydraulic binding agent can be hydraulic cements and mortars, as well as mixtures thereof such as concrete, beton and the like.

The reactive aluminum compound is unburned and is of the type which combines only in the presence of water, such as upon addition of the gauging water, with the calcium hydrate ($Ca(OH)_2$), gypsum ($CaSO_4$) and the components of the hydrating cement, to form sulfo-aluminates. The unburned reactive aluminum compound can be in the form of an aluminate (such as potassium aluminate), a hydrate, a salt (such as aluminum sulfate), and the like.

The relative proportions of the reactive aluminum compound, calcium hydrate and gypsum which are incorporated in the hydraulic binding agent are such that, upon addition of the gauging water, such ingredients will, with or without reacting with the ingredients of or compounds formed during the hydration of the binding agent, form calcium sulfo-aluminates having a high content of water of crystallization.

The following examples illustrate the reactions and the stoichiometric proportions of the components of addition compositions, containing different illustrative reactive aluminum compounds.

Example I

Alkali aluminate reacts with calcium hydrate to form calcium aluminate, which reacts with calcium sulfate to form calcium sulfo-aluminate, as shown by the following equations:

$$K_2O.Al_2O_3 + 3Ca(OH)_2 = 3CaO.Al_2O_3 + 2KOH$$

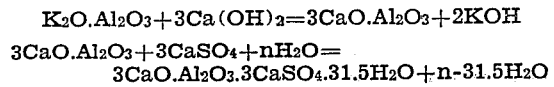

Thus, an addition composition containing potassium aluminate requires a stoichiometric combination of:

| | Mols |
|---|---|
| Alkali aluminate | 1 |
| Calcium sulfate, for instance in the form of finely ground gypsum | 3 |
| Calcium hydrate | 3 |

Example II

Aluminum hydrate, dried below 200° C. and finely pulverized, absorbs calcium hydrate in aqueous suspension, forming calcium aluminate, which combines with calcium sulfate to form sulfo-aluminate, as shown by the following equations:

$$2Al(OH)_3 + 3Ca(OH)_2 = 3CaO.Al_2O_3$$

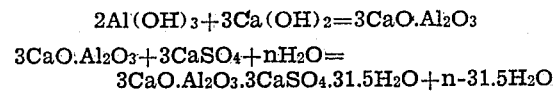

In this case, the composition of the mixture consists of:

| | Mols |
|---|---|
| Aluminum hydrate $(Al(OH)_3)$ | 2 |
| Ca'cium hydrate $(Ca(OH)_2)$ | 3 |
| Gypsum $(CaSO_4)$ | 3 |

Example III

When aluminum sulfate constitutes the reactive aluminum compound, the addition composition consists of:

| | Mols. |
|---|---|
| Aluminum sulfate $(Al_2(SO_4)_3)$ | 2 |
| Gypsum $(CaSO_4)$ | 6 |
| Calcium hydrate $(Ca(OH)_2)$ | 18 |

The three components of the addition composition can be ground together in their dry form, and the simplest method of incorporating such composition in the hydraulic binding agent is to mix such composition with the hydraulic binding agent, such as cement, mixture of cement and aggregates, at the time the mortar or concrete is gauged.

The powdered calcium hydrate component of the addition composition can be added separately to cement and the quantity thereof reduced by the quantity of calcium hydrate liberated during hydration of the cement. Instead of pure calcium hydrate, hydrated lime can be used.

In another embodiment of the invention, the calcium hydrate and calcium sulfate are added in dry powdered form to the hydraulic binding agent and the reactive aluminum compound is added together with the gauging water, in which it has been previously dissolved or suspended.

The quantity of the addition composition incorporated in the hydraulic binding agent depends upon the degree of expansion desired. In general, the addition composition can be from 1% to 30% by weight based on the hydraulic binding agent. In the preferred embodiment, the addition composition is added in an amount constituting from 5% to 20% by weight of the binding agent.

It was further found that the addition of a water-soluble compound, such as disclosed in United States Patent No. 2,174,051, and particularly a water-soluble salt of an organic acid which contains one or more carboxylic groups together with a plurality of hydroxyl groups, of which latter at least two hydroxyl groups are combined by aliphatic groups of radicals, in the quantity of 0.1 to 5.0 parts per mill (1,000 parts) of the total quantity of hydraulic binding agent, particularly Portland cement, accelerates formation of the sulfo-aluminate. At the same time, the required quanity of gauging water necessary to produce equal workability of mixtures of cement, expansive agents and aggregate can be reduced considerably. This has the added advantage that, due to the lower water content, shrinkage due to drying of concrete (which is not influenced by the expansive agent) is considerably reduced. Preferably, such water-soluble compound is incorporated in the addition composition, though it can be added to the cement directly or with the gauge water.

It was found that the addition of the above-described chemical compounds, according to the method described, is of great advantage in regard to the resultant compressive and particularly flexural strengths of concrete. The flexural strength can be increased 50% or more.

Favorable results are also obtained when at least one of the components of the addition composition, and particularly the reactive aluminum compound, is absorbed from an aqueous solution thereof by an inorganic absorbent, for example, surface-active inorganic substance such as trass, Kieselguhr and the like, or an absorbent gel such as silica gel, and, after the absorbent together with the compound absorbed thereby is dried and pulverized, it is mixed together with the other constituents of the addition composition. Alternatively, the dried and pulverized absorbent and absorbed material can be added directly to the cement to which the other components of the addition composition are also added. After the sulfo-aluminate compounds have been formed, the silica combines with the excess calcium hydrate of the cement, increases the density of the hardened concrete, and impedes change of the degree of dampness inside the concrete.

Some of the results obtained by the incorporation of the addition compositions of this invention in hydraulic binding agents are graphically shown in the drawings accompanying this application and wherein.

Figure 1:
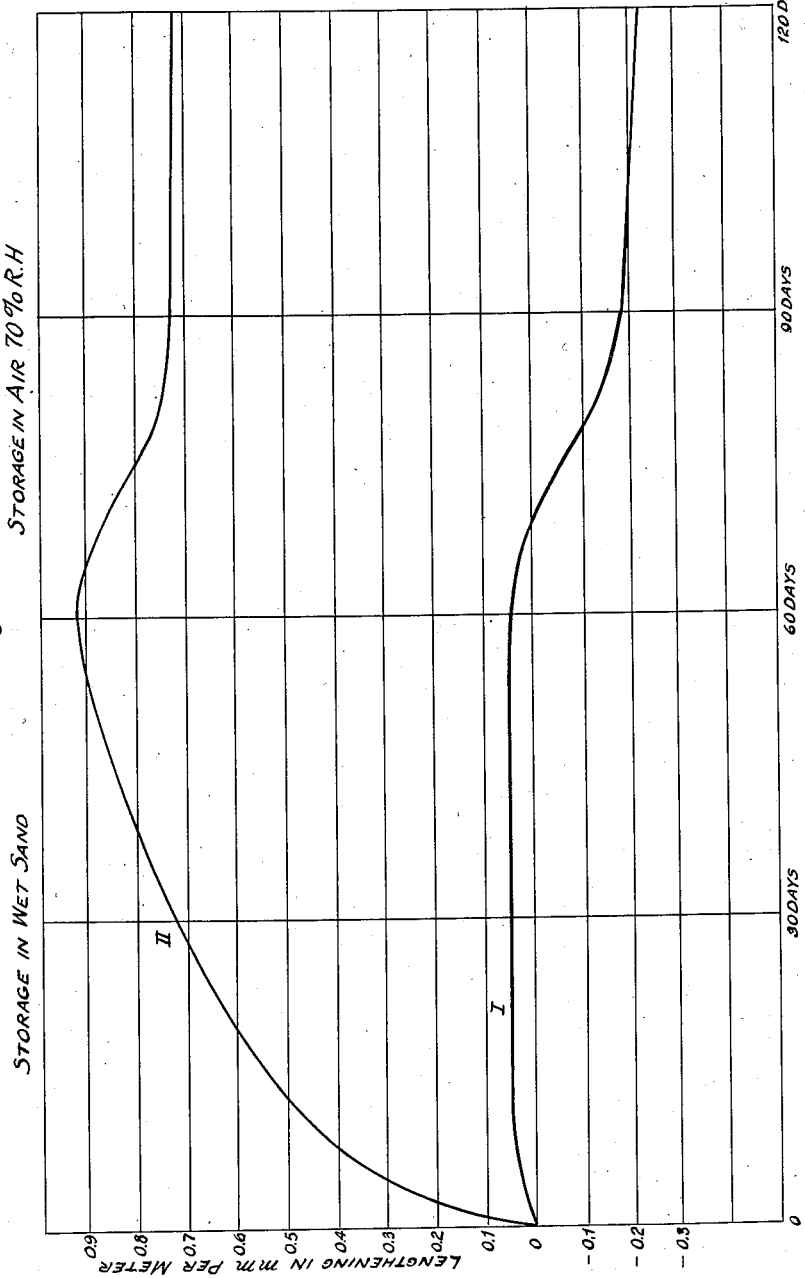
Figure 1 shows comparative shrinkage of concrete with and without the incorporation of the addition compound.

Referring now to Figure 1, curve I shows the shrinkage of concrete containing 6.2 bags of standard Portland cement per cubic yard (350 kgs. per cubic meter). This concrete was stored 60 days under moist sand and then stored in air of 70% relative humidity.

Still referring to Figure 1, curve II shows shrinkage, under the same conditions as that of curve I, of concrete of the same composition as the one described under curve I but containing 5% of the addition composition of Example III, the proportions being by weight and based on the cement.

Comparison of curve I with curve II shows that during hydration while stored in wet sand, the concrete without the addition (curve I) swelled approximately 0.05 mm. per lineal meter and during drying shrank slightly in excess of 0.2 mm. per lineal meter; while the concrete with the addition (curve II) swelled approximately 0.9 mm. per lineal meter during hydration while stored in wet sand and during drying shrank so as to give a permanent expansion of 0.7 mm. per lineal meter. At 28 days, the flexural and compressive strength of concrete with the addition was 80% to 90% of the concrete without the addition. However, after 90 days, i. e. after the expansive process and shrinkage due to drying had been completed, flexural strength of the concrete with the addition was 140% and compressive strength was 112% of the respective strength of the comparative plain concrete (no addition).

Figure 2:
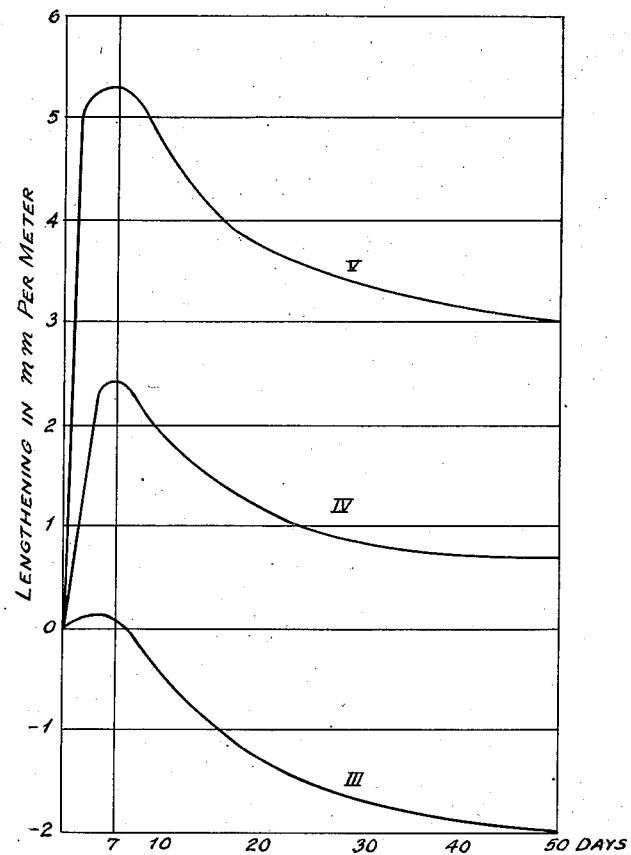
Figure 2 shows comparative shrinkage of Portland cement without sand, and of such cement with 5% and 10% of the addition compound.

Referring now to Figure 2, curve III shows the shrinkage of a specimen formed of Portland cement without sand (neat cement) during storage in air of 70% relative humidity after initial storage in water for 7 days. Curve IV shows the volume changes (under the same conditions of curve III) of the same cement to which, before gauging, 5% of the addition compound set forth in Example II was added prior to gauging. Curve V shows the volume changes (under the same conditions of curve III) of the same cement to which, before gauging, 10% of the addition compound of Example II was added. As shown by the curves III, IV and V, the cement without any addition compound shrank 2.0 mm. per lineal meter, whereas the cement containing 5% addition showed an increased in volume of 0.7 mm. and an increase of 3.0 mm. per lineal meter with the 10% addition.

Figure 3:
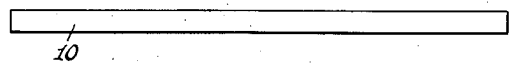
Figure 3 is a front elevation of a beam reinforced on one side.
Figure 4:
Figure 4 is an end view of such beam.
Figure 5:
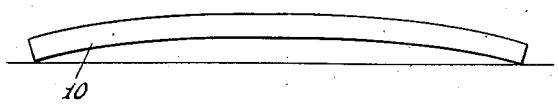
Figure 5 is a side elevation of the beam after hydration.

Referring now to Figures 3, 4 and 5, the reference numeral 10 designates a beam 1½" x 2½" x 40" (4 x 6 x 100 cm.) containing 9 bags of Portland cement per cubic yard (500 kgs. per cubic meter), reinforced on one side with the reinforcements 12. Due to the incorporation of the addition composition of this invention in the cement, the reinforcing steel becomes pre-stressed, resulting in a strong flexure in the beam, as shown in Figure 5, due to the fact that the reinforcements were inserted into only one side of the beam.

The instant invention provides an addition composition which can be easily obtained and does not require the production of a special cement obtained by burning certain ingredients. The instant invention does not require addition of sulfate in the form of anhydrous sulfo-aluminate or as a mixture of calcium sulfate with clinkers containing aluminates and anhydrous gypsum. The method of incorporation of the addition compound is simple and easy to effect.

Since it is obvious that various changes and modifications may be made in the above description without departing from the nature or spirit thereof, this invention is not restricted thereto except as set forth in the appended claim.

We claim:

A composition for addition to hydraulic cements, the composition forming a calcium sulpho aluminate of high crystalline water content when said cement is hydrated and imparting a permanent increase volume to the cement after hydration, said composition consisting essentially of calcium hydrate, calcium sulphate, and an aluminum compound selected from the group consisting of aluminum hydrate, and alkali aluminate and aluminum sulphate in substantially stoichiometric proportions to form said calcium sulpho aluminate, said composition also containing a water soluble organic carboxylic acid compound containing at least two hydroxyl groups combined by aliphatic groups in an amount to constitute 0.1 to 5.0 parts per thousand parts of the hydraulic cement, the said compound serving to accelerate and intensify the formation of the calcium sulpho aluminate.

FRITZ A. SCHENKER.
THEODORE A. SHANN.

REFERENCES CITED

The following references are of record in the file of this patent:

UNITED STATES PATENTS

| Number | Name | Date |
| --- | --- | --- |
| 903,019 | Spackman | Nov. 3, 1908 |
| 1,194,926 | Anderson | Aug. 15, 1916 |
| 1,844,663 | Kirchner | Feb. 9, 1932 |
| 2,174,051 | Winkler | Sept. 26, 1939 |
| 2,393,597 | Drummond | Jan. 29, 1946 |

FOREIGN PATENTS

| Number | Country | Date |
| --- | --- | --- |
| 780,747 | France | 1935 |

OTHER REFERENCES

Lea and Desch, The Chemistry of Cement and Concrete, Edw. Arnold, London (1935), pages 93 to 97 and 187.